US010471955B2

(12) United States Patent
Kouri et al.

(10) Patent No.: US 10,471,955 B2
(45) Date of Patent: Nov. 12, 2019

(54) STOP SIGN AND TRAFFIC LIGHT ALERT

(71) Applicant: lvl5, Inc., San Francisco, CA (US)

(72) Inventors: Andrew Kouri, San Francisco, CA (US); George Tall, San Francisco, CA (US)

(73) Assignee: lvl5, Inc., San Francisco, CA (US)

(*) Notice: Subject to any disclaimer, the term of this patent is extended or adjusted under 35 U.S.C. 154(b) by 0 days.

(21) Appl. No.: 16/034,269

(22) Filed: Jul. 12, 2018

(65) Prior Publication Data

US 2019/0023266 A1    Jan. 24, 2019

Related U.S. Application Data

(60) Provisional application No. 62/534,144, filed on Jul. 18, 2017.

(51) Int. Cl.
*B60W 30/09* (2012.01)
*B60Q 9/00* (2006.01)
(Continued)

(52) U.S. Cl.
CPC ............ *B60W 30/09* (2013.01); *B60Q 9/008* (2013.01); *G01C 21/00* (2013.01); *G06K 9/00818* (2013.01); *G06K 9/00825* (2013.01); *G06T 7/00* (2013.01); *G06T 17/05* (2013.01); *G08G 1/04* (2013.01); *G08G 1/09623* (2013.01); *G08G 1/166* (2013.01); *B60Q 2300/112* (2013.01); *B60Q 2300/45* (2013.01); (Continued)

(58) Field of Classification Search
CPC .. B60W 30/10; B60W 30/09; B60W 2520/10; B60W 2550/22; B60W 10/06; B60W 10/20; B60W 2550/147; B60W 30/00; B60W 30/095; B60Q 9/008; B60Q 2300/112; B60Q 2300/45; G01S 17/936; G01S 7/4817; G05D 1/00; G05D 1/0238; G05D 1/024; G05D 1/0242; G05D 1/0274; G05D 1/0278; G05D 2201/0213; G06T 7/00; G08B 21/0476; G08B 21/06; G08B 1/015; G08B 1/04; Y10S 706/905
USPC ........................................................ 340/435
See application file for complete search history.

(56) References Cited

U.S. PATENT DOCUMENTS 6,915,228 B2 * 7/2005 Uffenkamp ............ G01D 18/00
                                                      348/47
7,636,455 B2 * 12/2009 Keaton ................. G06K 9/0063
                                                      348/118
(Continued)

FOREIGN PATENT DOCUMENTS

EP       2747027 A1 * 6/2014 ........... G06K 9/4628

*Primary Examiner* — Emily C Terrell
(74) *Attorney, Agent, or Firm* — Cognition IP, P.C.; Bryant Lee

(57) ABSTRACT

Embodiments relate generally to three-dimensional mapping and more particularly to creating and using three-dimensional feature maps to improve vehicle safety. Features of a road and surrounding area are identified from imaging and telemetry data. One or more constraints such as dimensions or distances of each feature are estimated from the telemetry and imaging data. A feature map is derived from the constraints and the identified features. Some example applications include using the feature map in automatic emergency braking systems or forward collision warning systems.

10 Claims, 9 Drawing Sheets
(2 of 9 Drawing Sheet(s) Filed in Color)

(51) Int. Cl.
*G06K 9/00* (2006.01)
*G06T 17/05* (2011.01)
*G08G 1/16* (2006.01)
*G08G 1/04* (2006.01)
*G08G 1/0962* (2006.01)
*G01C 21/00* (2006.01)
*G06T 7/00* (2017.01)

(52) U.S. Cl.
CPC ..... *B60W 2520/10* (2013.01); *B60W 2550/22* (2013.01); *G06T 2207/20084* (2013.01); *G06T 2207/30256* (2013.01); *G06T 2207/30261* (2013.01)

(56) References Cited

U.S. PATENT DOCUMENTS

| | | | |
|---|---|---|---|
| 10,082,798 B2* | 9/2018 | Shashua | G01C 21/32 |
| 10,152,780 B2* | 12/2018 | Hsu | G06T 7/143 |
| 2005/0187711 A1* | 8/2005 | Agrawala | G01C 21/367 |
| | | | 701/455 |
| 2017/0008521 A1* | 1/2017 | Braunstein | G01C 21/32 |
| 2018/0189578 A1* | 7/2018 | Yang | G01C 21/3635 |

* cited by examiner

1. Signs
    a. Stop
    b. Yield
    c. Speed Limit
    d. Warning
    e. Construction
    f. Regulatory
    g. Directional
2. Traffic Lights
    a. Vertical
    b. Horizontal
    c. Front
    d. Back
    e. Left/Right Side
3. Base of fixed vertical object
    a. Trees
    b. Poles
4. Hydrants
    a. Fire Hydrant
5. Parking Meters
    a. Single
    b. Multi
6. Box
    a. Utility
    b. Mail Drop
7. Residential Mailbox
    a. Single
    b. Multi
8. Street Light
    a. Vertical
    b. Boomed
9. Temporary Traffic Safety items
    a. Traffic Cone
    b. Post
    c. Barricade
    d. Drum
    e. Bollard
10. Road Surface Features
    a. Pothole
    b. Manhole
    c. Handhole
    d. Storm Drain
    e. Speed Bump
    f. Botts' Dots
11. Road Paint
    a. Road Arrow
    b. Lane Lines
    c. Parking Line
    d. Stop Line
    e. Crosswalk

FIG. 2

STOP SIGN AND TRAFFIC LIGHT ALERT

CROSS-REFERENCE TO RELATED APPLICATIONS

This application claims the benefit of U.S. Provisional Application No. 62/534,144, filed Jul. 18, 2017, the entire contents of which are incorporated herein by reference.

FIELD OF INVENTION

The present disclosure relates generally to three-dimensional mapping and more particularly to creating and using three-dimensional feature maps to improve vehicle safety.

BACKGROUND

Some modern vehicles are equipped with a featured called forward collision warning (FCW), which alerts a driver if they are about to run into a stopped or slowing vehicle in front of them. Some of these vehicles also implement a feature called automatic emergency braking (AEB), which takes this concept a step further by slamming on the vehicles brakes if it is sure that a collision is imminent. The goal of both of these systems is to reduce fatal accidents.

Despite these features, however, driving is still hazardous. For example, approximately 2.5 million accidents are reported every year in intersections along. Among those accidents, it is estimated that over 95% are attributable to driver error.

SUMMARY

Embodiments described below are related to improving driving safety in dangerous zones such as intersections. Some aspects of the disclosure relate to producing accurate three-dimensional maps of roadways and intersections including positions of stop signs and traffic lights. Some embodiments may accomplish this accurate three-dimensional mapping using only sensors and systems that may be commonly found in a consumer smartphone such as a camera, accelerometers, and GPS location sensors. In some embodiments, these components may be integrated into what is referred to as a dashcam.

Using these detailed three-dimensional feature maps, various embodiments described herein may confidently and accurately aid drivers in navigating dangerous intersections. Some embodiments may further be used by autonomous or semi-autonomous vehicles for navigation. In some embodiments, a vehicle may be localized on a roadway to within 10 centimeter precision using common hardware as discussed above. Using this precise localization, in some embodiments, drivers may be alerted of a stop sign or traffic light so that a particular driver may pay more attention to the stop signs or traffic lights that the driver is approaching. Similarly, an autonomous vehicle may operate a vehicle in a similar setting to stop the vehicle at a traffic signal or stop sign. Yet more applications and embodiments using three-dimensional feature maps and vehicle localization are described in this disclosure.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become better understood from the detailed description and the drawings, wherein:

FIG. 2 illustrates an example categorization of features in an embodiment;

DETAILED DESCRIPTION

Embodiments described below relate to producing a three-dimensional map of a vehicle's surroundings. Such a detailed three-dimensional map may be used for a variety of purposes. For example, some embodiments relate to precisely localizing a vehicle on a road. Examples below may localize a vehicle with an error of as little as 10 centimeters. This level of localization may be used, in turn, for many different driver assistance applications such as forward collision warning or automatic emergency braking. In addition, the precise localization described below may be used to navigate and control autonomous vehicles.

Figure 1:
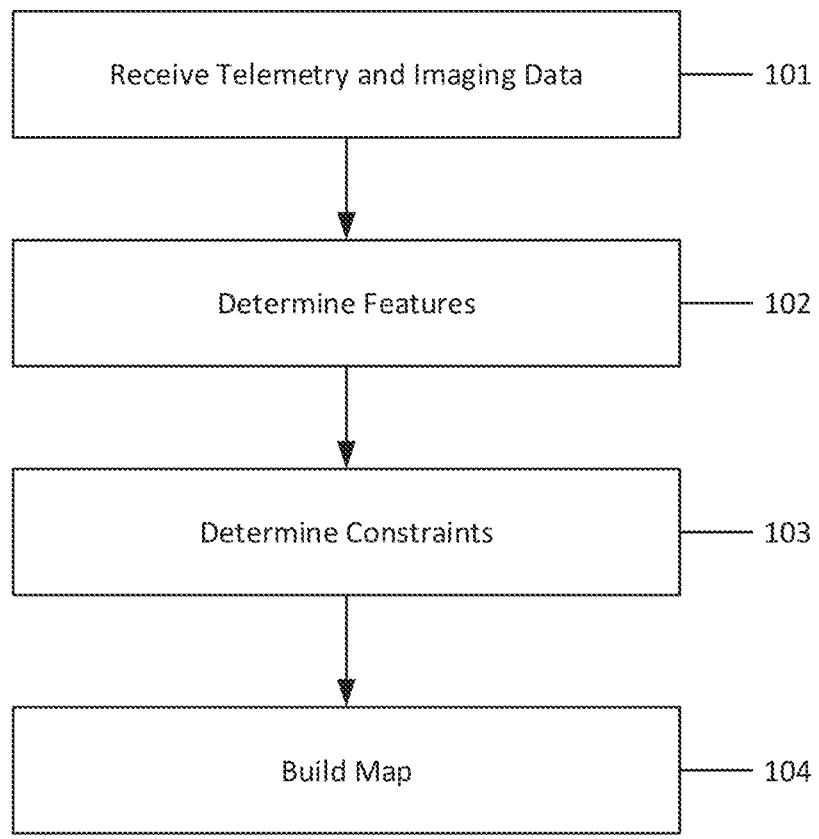
FIG. 1 illustrates a method for producing a three-dimensional feature map according to an embodiment.

FIG. 1 illustrates a method for producing a three-dimensional feature map according to an embodiment. At step 101, the three-dimensional feature mapping system acquires telemetry data from a plurality of sensors associated with a vehicle in conjunction with imaging data from one or more imaging sensors. The data gathered from these platforms and sensors may be collectively referred to as telemetry. The telemetry data may be stored or recorded with a timestamp or other temporal information to align the various sensor readings during later processing.

Examples of imaging sensors include video cameras, still image cameras, or a plurality of video or still image cameras. Examples of telemetry sensors include, but are not limited to, accelerometers, odometers, gyroscopes, satellite positioning sensors such as GPS or GLONASS, radar range finders, LIDAR ranging and mapping instruments, and SONAR sensors. Similarly, radio frequency triangulation methods may be used to estimate or determine location. For example, location may be determined by differential reception to cellular towers or wi-fi access points.

One or more sensors may be integrated into one or more platforms such as a mobile phone, a purpose-built device, or integrated into the vehicle itself. For example, in an embodiment, a mobile phone including a video imaging sensor, a GPS location sensor, and a plurality of accelerometers may be used as a telemetry gathering platform. Telemetry sensors may similarly be integrated into a vehicle. For example, odometer sensors may be accessed through an on-board diagnostics (OBD) data interface of a vehicle.

Sensors may be pre-processed to prepare data for feature extraction and localization. For example, the three-dimensional feature mapping system may estimate an initial vehicle position based on a GPS reading at 1 Hz but capture video frames of an imaging sensor at 30 Hz. If the three-dimensional feature mapping system needs a more granular location estimate for the imaging sensor, the three-dimensional feature mapping system may interpolate the 1 Hz GPS reading to produce values that align with the 30 Hz video capture.

Furthermore, vehicle position may be determined from visual cues observed by a vision system on the vehicle. For example, some embodiments may employ visual inertial odometry (VIO) to determine a position of the vehicle in addition to other positioning information such as global positioning satellite information. A VIO system may be configured to provide position and speed estimates at a rate equal to the frame rate at which a vision system captures images. For example, a VIO system may provide position estimates at a rate of 30 Hz. In some embodiments, multiple positioning readings and estimates having differing refresh rates may be combined to provide an accurate position determination. For example, GPS position readings at a first refresh rate and VIO position readings at a second refresh rate may be combined by a common filter to provide continuous position information at a third refresh.

Returning to FIG. 1, at step 102, individual features are determined from the collected telemetry data. For each set of imaging data and associated telemetry, the three-dimensional feature mapping system may generate a three-dimensional map of the vehicle's surroundings combining all independent observations of visual features and telemetry data.

Examples of features that may be encountered on a road include, for example, traffic signs such as stop signs, yield signs, speed limit signs, warning signs, construction signs, or directional signs. Features may also include, for example traffic lights in either vertical or horizontal orientation on any side of the vehicle. Additional features may include various objects typically observed near a roadway such as trees, poles, fire hydrants, parking meters, mail boxes, street lights, or the like. Various traffic safety items may also be features, such as traffic cones, barricades, safety drums, bollards, or posts. Road paint may also be a visual feature, such a arrows, lane lines, parking lines, stop lines, or crosswalks. Any number or combination of these features or other similar features may be present on or around a roadway.

In some embodiments, features may be non-visual. In an example, some embodiments may sense road surface features. Any perturbations sensed by any telemetry sensors such as gyroscopes, accelerometers, or satellite positioning sensors may be related to vibrations, potholes, and bumps in the road surface. Because these features may be characteristic of the road, they may be used to characterize the road and localize a car on the road surface.

Other examples of non-visual features include radar detected features. For example, radar signatures of various road features such as potholes, manhole covers, or large overhead signs may be detected by radar sensors in vehicles. In some embodiments, a vehicle may include multiple radars covering forward, backward, and/or lateral perspectives. Radar readings may be aggregated over a short time span and preprocessed to better detect these kinds of features. For example, in an embodiment, radar readings from the last 10 seconds may be processed by a particle filter to locate possible features.

Similar to radar detected features, other proximity or ranging sensors on a vehicle may also detect non-visual features. For example, ultrasonic telemetry sensors may detect unique signatures of guard rails, curbs, and other fixed landmarks on or around a roadway.

The various features may be hierarchically categorized. FIG. 2 illustrates an example categorization of features 200 in an embodiment. For example, categories include "Signs," "Traffic Lights," and so on. Features such as "Stop" and "Yield" are categorized in the "Signs" category.

In some embodiments, feature recognition may be performed using computing resources local to the moving vehicle. For example, the mobile phone of the examples above may be attached to a vehicle and contain a processor that can execute instructions to recognize features from the telemetry data. In some embodiments, feature recognition may be performed remotely from the vehicle. For example, the telemetry data may be transmitted to a remote processing location to process the data to recognize features at a later time. In some examples, such remote processing may provide greater computing resources as compared to computing resources on the moving vehicle. In an embodiment, the remote processing location may be a data center with one or more computing platforms configured to perform feature recognition from telemetry data. In some embodiments, a blend of local and remote processing may be employed where some processing is performed using computing resources local to the moving vehicle and other processing is remote from the vehicle, for example in a data center.

In some embodiments, the three-dimensional feature mapping system may keep track of state between frames to improve feature recognition. For example, features may be tracked between frames or time slices of telemetry data both forward in time and backward in time to find consensus among features. For example, if a feature is observed in one image frame, then the three-dimensional feature mapping system can predict it to be observed in the next frame based on motion of the telemetry capturing sensors. The motion of the telemetry capturing sensors may be determined by other telemetry sensors. For example, the change of location sensed by a GPS sensor may be used to predict or determine the motion of a camera sensor known to move in a predictable relation to the GPS sensor. Other such sensor pairing may similarly be used to determine the location of a camera sensor and improve inter-frame feature predictions.

The three-dimensional feature mapping system may use a neural network or a plurality of neural networks to recognize features in the imaging data. In some examples, the three-dimensional feature mapping system may use convolutional feed-forward neural networks to detect features in the imaging data. In some examples, the three-dimensional feature mapping system may use recurrent neural networks to detect features in the imaging data. A combination of approaches may also be used, or any other similar neural network architectures and topologies may be used as well.

In some examples, the three-dimensional feature mapping system may recognize whole features in the telemetry data and represent features as a bounding box enclosing those pixels belonging to a feature in a video feed. In some examples, the three-dimensional feature mapping system may label individual pixels to be of a feature class, sometimes referred to as pixel segmentation or semantic segmentation.

In some embodiments, additional features may be determined to aid three-dimensional positioning. For example, some areas of road may be devoid of readily-identifiable features such as stop signs or curbs. In these cases, the three-dimensional feature mapping system may identify a trackable feature as a group of pixel-level points-of-interest in the image data and track these features. In some embodiments, pixel-level visual descriptions for each point-of-interest are computed.

In some embodiments, the three-dimensional feature mapping system may provide for a manual review of some labeled data. Feature labels may be selected for review based on metrics such as the relative uncertainty in visual observation measurements as well as an estimated error output derived from a visual measurement consensus from a mapping algorithm. In some examples, sets of features may be identified for review, such as all features associated with a particular location or feature type. If a generated feature label is determined to be incorrect, it may be corrected by the manual review and also used in future neural network training processes to improve accuracy of similar or related generated feature labels in the future.

The three-dimensional feature mapping system may generate a feature correlation that estimates the probability that any one class and/or subclass of feature might be confused by a neural-network-based object detector with another class of feature. For example, the system may generate a confusion matrix based on statistics from human-labeled data that represents the probability that any given feature will be mislabeled as another feature.

An example confusion matrix may include all feature types and categories illustrated in FIG. 2 in an embodiment. The confusion matrix includes an entry for each feature mapped to every other feature. In an example, a "parking meter" feature may be estimated to have a 0.000004% chance of being confused with a "storm drain" feature, and so on. Similarly, the feature identification network may label a "pothole" as a "manhole" with a probability of 0.0284% and may only confuse a traffic cone with a stop sign with a probability of 0.001%. Additionally, in some embodiments, the confusion matrix may include a probability that a bounding box or pixel segmentation is too big or too small for a given feature.

Returning to FIG. 1, at step 103, a distance and relative position is inferred from the video and telemetry data for each recognized feature. That is, the features locations in a three-dimensional map are determined based on the video and telemetry data. Various methods may be used to infer or deduce a distance of a feature or object from the video and telemetry data.

Figure 3A:
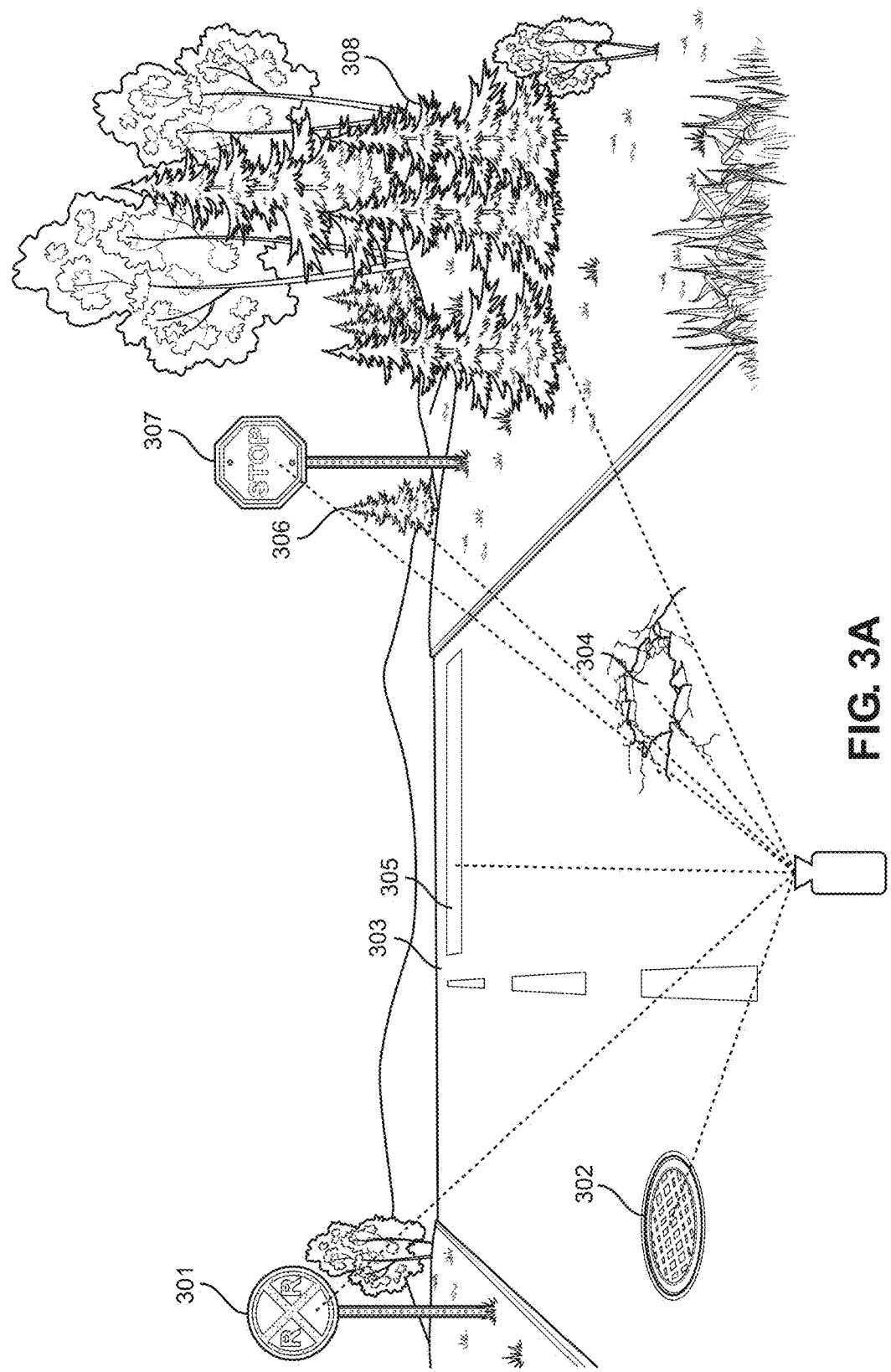
FIG. 3A illustrates an example local feature map according to an embodiment.

FIG. 3A illustrates an example local feature map according to an embodiment. The example local feature map illustrates road feature such as manhole cover 302, lane divider 303, pothole 304, and stop line 305. The feature map also includes features near a road or on the side of the road such as traffic sign 301, trees 306 and 308, and stop sign 307. Each of these features may be included in an example local feature map.

Figure 3B:
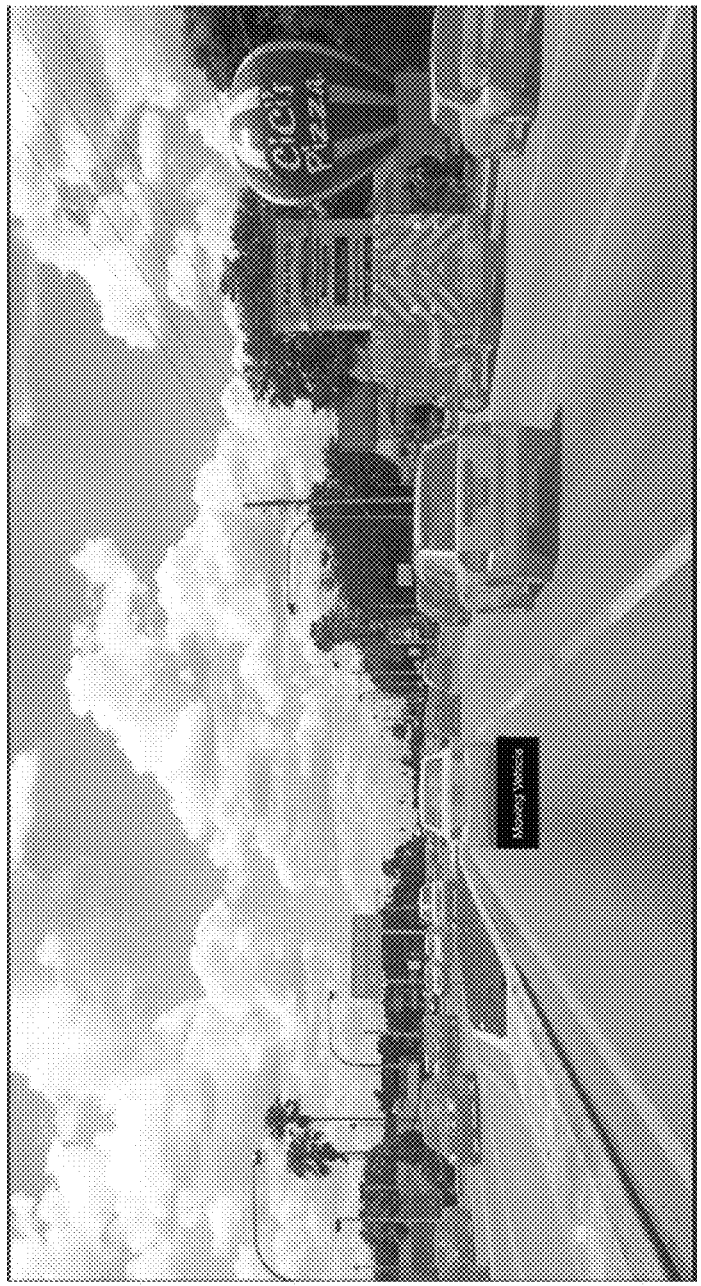
FIG. 3B illustrates an example semantically segmented image of a road according to an embodiment.
Figure 3C:
FIG. 3C illustrates an example of lane marker identifications according to an embodiment.

FIGS. 3B and 3C illustrate examples of images having features that have been identified and located. FIG. 3B illustrates an example semantically segmented image of a road according to an embodiment. In this example, an image of a road including vehicles moving on the road and various features of the road and surrounding area are pictured. Each feature is colored according to a semantic label. For example, the label of a moving vehicle is illustrated, and various lane marker features are also visible. FIG. 3C illustrates an example of lane marker identifications according to an embodiment. In FIG. 3C, the lane markers of a road segment are pictured in an overhead view.

For example, one method of determining the distance to a feature uses one or more neural networks. In an embodiment, a neural network may be trained with images labeled with features and known distances to those features. For example, known distances may be determined from a LIDAR range finding device. Other methods of inferring a distance to a feature may be used. In an embodiment, a distance may be determined based on known intrinsic camera properties and known object templates. For example, if the dimensions of a traffic light are known, a distance from a camera may be estimated based on the properties of the camera lens and sensor system.

In some embodiments, feature movement over time as recorded through subsequent video frames may be used to deduce or estimate distance to the feature. Because the vehicle's speed, location, and orientation is known, any changes in feature size, perspective, or rate of change between frames may be leveraged to produce size and orientation estimates. In this way, three-dimensional features may be determined from subsequent frames of two-dimensional images.

Some embodiments may employ a monocular visual simultaneous localization and mapping (SLAM) method. SLAM systems can process the input of a single camera and continuously build up a three-dimensional model or map of an environment as the camera moves around in the environment. Visual SLAM systems can simultaneously track the position and orientation or pose of the camera with respect to the three-dimensional model. Keyframe-based visual SLAM systems can process discretely selected frames from the incoming camera image stream or feed. Keyframe-based visual SLAM systems assume general camera motion and apply structure-from-motion techniques to create three-dimensional feature maps.

In some embodiments, telemetry data from ranging sensors may similarly be used to estimate the distances to features in the imaging data. For example, LIDAR or radar telemetry data may provide range readings or estimates for various portions of the imaging data, which may then be used to determine or estimate other distances to features in the imaging data.

In some instances, the three-dimensional feature mapping system can generate a refined three-dimensional map of features with relative precision that is greater than any individual measurement or telemetry sensor reading. Every telemetry measurement device has some bias or accuracy level associated with its measurement. An individual telemetry or imaging sensor may introduce this bias into a resultant three-dimensional feature map. However, by combining measurements and estimates from a plurality of telemetry sensors and ranging techniques over a series of time steps, the effect of any single sensor's bias or accuracy on the three-dimensional feature map may be reduced. In some embodiments, the three-dimensional feature mapping system determines a maximum likelihood estimation of the three-dimensional positions and orientations of features as well as the trajectories of each telemetry sensor that contributed observations to the map. For each measurement device or class of measurement devices, the three-dimensional feature mapping system generates an error model by comparing samples of measurements against a ground-truth.

Additional three-dimensional ranging and localization of features may be performed based on non-measurement constraints. For example, the motion of a vehicle may be predicted based on the vehicle's characteristics and state and road geometry. Therefore, a vehicle's motion may be predicted between imaging frames if other such information is known or able to be known. Other a priori information may be used. Certain assumptions of features placement may be made based on conventional placement or dimensions. For example, stop signs may be known to be placed at a certain elevation over a road surface, or various traffic light components may be placed within a predictable, known distance of one another.

Returning to FIG. 1, at step 104, a map is produced based on the features and their respective determined or estimated positions. For each feature, a set of constraints is determined by the various methods described above. For example, for a stop sign, a set of predictions is derived regarding the size and position of the stop sign within a three-dimensional space. Each prediction also may have an error radius or measurement associated with it, such that the producing method or system is confident that the ground truth lies within some interval of the prediction.

All of the various constraints for each feature in a local three-dimensional map around a vehicle may be organized into a graph data structure. In this graph, the vertices represent features or positions of measuring devices at the time of measurement recording. The edges in the graph represent some kind of constraint between features or the observer, i.e., the vehicle. The edge constraints may represent a relative position between two features. For example, one edge constraint may be related to a predicted distance between two traffic light features. Edge constraints may similarly be between the observer and a feature. For example, a predicted distance from the vehicle to one of the traffic lights may be represented as an edge in the constraints graph. Yet other edge constraints may relate features or the observer to a global coordinate frame such as a GPS constraint on a vehicle locating the vehicle within a global coordinate system. Each constraint has some associated modeled error estimate which is a function of the system producing the constraint as well as various circumstances of the observation. For example, a vision system may indicate a higher predicted error rate for estimated measurements during conditions of low visibility such as fog.

In some embodiments, the three-dimensional feature mapping system can directly generate a refined three-dimensional map of the features by optimizing for lowest error in the system (or a part of the system) of constraints using non-linear least squares on every observation measurement. The solving of non-linear, over-constrained systems may use an initial estimate of the system parameters such as positions and orientations of features in the map, as well as positions and orientations of the observing devices used to collect the original measurements.

Several sources of error may impede the map-building process. In some examples, an incorrect or erroneous observation constraint may make a maximum likelihood estimation difficult. Similarly, erroneous initial values of optimizable parameters may pose a problem. To address these and other similar issues, the three-dimensional feature mapping system may remove outliers based on optimizing for lowest total error in the constraint system, when tuned with a set of ground-truth intersections. Also, the three-dimensional feature mapping system may reduce any sensitivity to erroneous initial values by iteratively seeding the optimization problem with intentionally noisy values and comparing the resulting solutions by their total residual error.

A complete constraint map of an entire geographic region such as a country or a continent may contain hundreds of millions of individual constraints. Solving the entire system as a whole may be too computationally intensive to do efficiently and quickly. Therefore, the three-dimensional feature mapping system may subdivide the entirety of a global feature map constraint graph into a plurality of smaller sub-graphs.

Borders between sub-graphs may be chosen to minimize the impact on the final, independent solutions of adjacent graphs. In some embodiments, portions of the constraint graph that are highly connected may be left intact, with borders drawn along relatively less connected areas. For example, an intersection may comprise a highly connected area of the constraint graph that may be selected to be left relatively intact. Regions of long interconnecting roads with comparatively fewer features may be selected as regions more appropriate for boundaries between sub-graphs.

By breaking the large global constraint graph into a set of smaller sub-graphs, the overall solution may be solved in parallel by processing the sub-graphs independently. When two sub-graphs adjoin along a roadway, maximum likelihood estimation continues, though this time, treating the highly-connected intersection graphs as single, solved problems, reducing the complexity of the optimization problem immensely.

In some embodiments, the three-dimensional feature mapping system may produce a three-dimensional map from a single vehicle collecting imaging and telemetry data. In other embodiments, a plurality of vehicles may collect imaging and telemetry data jointly. In some embodiments, this use of multiple sources may be referred to as crowd-sourcing of telemetry and imaging data. In this way, the three-dimensional feature mapping system may integrate information from multiple sources over time, progressively updating and improving a shared three-dimensional map. The total confidence of map features may then iteratively increase with successive data gathering from distinct vehicles. In an example, each additional car driving down the same road may add new or updated feature measurements to the three-dimensional map. With additional constraints from each successive measurement, the error radius around each feature may decrease proportionately.

In some embodiments, relatively unprocessed telemetry and imaging data may be uploaded from an observing vehicle to a server for processing and integration into a global feature map. In some embodiments, a vehicle may perform some of the tasks of producing a local feature map using computing resources onboard the vehicle. In these embodiments, the vehicle may transmit a compressed three-dimensional map representation to a central server or location for integration into a global feature map. In some embodiments, local feature maps may be represented as a sparse matrix representation containing labeled bounding boxes for features. Such a representation is likely much more compact than the original sensor data. The sparse matrix representation may be uploaded to the central server as the compressed three-dimensional map representation. The transmission of the compressed representation may be significantly faster than transmitting unprocessed telemetry and imaging data.

In an embodiment, the combined imaging data and telemetry data associated with a particular vehicle may be referred to as a trace. For each new trace, the three-dimensional feature mapping system may apply the various methods and techniques described above to generate a local three-dimensional map based on the information in that trace. For a set of traces, a respective set of local three-dimensional maps is produced. Due to variations in sensors, processing, conditions, and other environmental variations, the local three-dimensional maps for each trace will typically not be exact matches. Individual features may not exactly match from trace to trace. To resolve these differences, the three-dimensional feature mapping system combines local maps to minimize the total error in an aggregate global three-dimensional map. In an embodiment, a clustering algorithm such as density-based spatial clustering of applications with noise (DBSCAN) may be employed to determine feature locations in a global feature map.

In an embodiment, the three-dimensional feature mapping system may use a bundle adjustment technique to combine these disparate datasets. Specifically, the three-dimensional feature mapping system may minimize a cost function that quantifies the map alignment error, with regards to both structure and motion variations. The three-dimensional feature mapping system may further propagate the probabilities of confusion into a bundle adjustment optimization so that for each combination of traces, several potential global maps are output with the resulting error rate. Then, the one of the several potential global maps with the lowest overall error may be selected.

In some embodiments, the three-dimensional feature mapping system may incentivize individual users to drive selected routes and roads to gather additional trace data. For example, the three-dimensional feature mapping system may incentivize roads and routes that have the greatest likelihood of change since a last trace observation. Factors that may contribute to a prediction of a likelihood of change for a segment of road may include, for example, the time elapsed since the last trace observation, the type of road, and environmental factors. Roads may be typed or categorized according to, for example, the number of lanes on the road, the traffic load of the road, a location such as proximity to an urban center, construction activity on the road, proximity to other roads, population count or density of the surrounding area, resident count of density of the surrounding area, road condition such as known potholes, and signage. Environmental factors may include, for example, recent weather conditions or patterns which may be likely to alter road conditions. The three-dimensional feature mapping system may incentivize acquisition of trace data for roads or road segments that have a high likelihood of change since the last known trace observation. In some embodiments, a threshold percentage of road segments with the highest likelihoods of change may be prioritized or incentivized for new trace acquisition. In some embodiments, all segments with a likelihood of change above a threshold likelihood may be prioritized or incentivized for new trace acquisition.

The resultant global three-dimensional feature map may be stored and transmitted to operating vehicles for various navigational, driver-assist, and autonomous vehicle applications. The global three-dimensional feature map may be compressed to reduce bandwidth consumed when transmitting to vehicles. For example, the global feature map may be stored and transmitted as a sparse representation of semantically labeled coordinates of features to efficiently encode the three-dimensional objects and their locations. In an embodiment, an autonomous vehicle uses the global feature map for general navigation purposes, such as generating routes from a starting location to a target location.

In an embodiment, the global three-dimensional map may be segmented into regularly sized tiles. Then, the tiles that a vehicle may need, based on its trajectory, may be downloaded and stored locally for fast retrieval onboard the vehicle. The three-dimensional feature mapping system may predict the user's trajectory from a combination of inputs such as the destination of the vehicle if known, history of previous destinations or trips, availability of cell phone service, density of road networks, and similar trip trajectories. In this way, the global three-dimensional map may be efficiently downloaded and cached locally in the vehicle for use.

In an embodiment, the tiles are rectangular and nine tiles are downloaded to the vehicle. The vehicle may download the current tile it is in and each adjacent tile in two dimensions. The adjacent tiles may comprise the tiles to the north, south, east, west, northeast, northwest, southeast, and southwest.

Once a vehicle has a three-dimensional feature map loaded, the map may be used to localize the vehicle on a roadway. In some embodiments, this localization may be precise down to 10 centimeters accuracy.

To localize a vehicle on a roadway using a three-dimensional feature map, the three-dimensional feature mapping system follows a similar procedure as was used to generate the map originally. That is, imaging data is acquired from a vision system and telemetry data is acquired from sensors such as gyroscopes, wheel odometers, vehicle velocity sensors, accelerometers, and other such telemetry sensors on a vehicle. Then a local three-dimensional feature map is determined from these inputs and compared with the known global three-dimensional feature map. The respective error estimates for each map are taken into account for the comparisons.

The various feature estimates and constraint estimate are then filtered by a filter such as a Kalman filter or a particle filter. An optimization engine may then be used to determine a best estimate of the pose and position of the vehicle within the global three-dimensional feature map. In some embodiments the three-dimensional feature mapping system may use monocular SLAM techniques such as described above to solve for a position of the vehicle. In some embodiments, the three-dimensional feature mapping system may also use additional telemetry data to determine a best guess position based on dead-reckoning to use in combination with the optimization engine output. In some embodiments, a pose of the vehicle may be further estimated from trilateration of feature positions. For example, the three-dimensional feature mapping system may be able to use particular features positions such as a stop sign to estimate a relative position of the vehicle.

Figure 4:
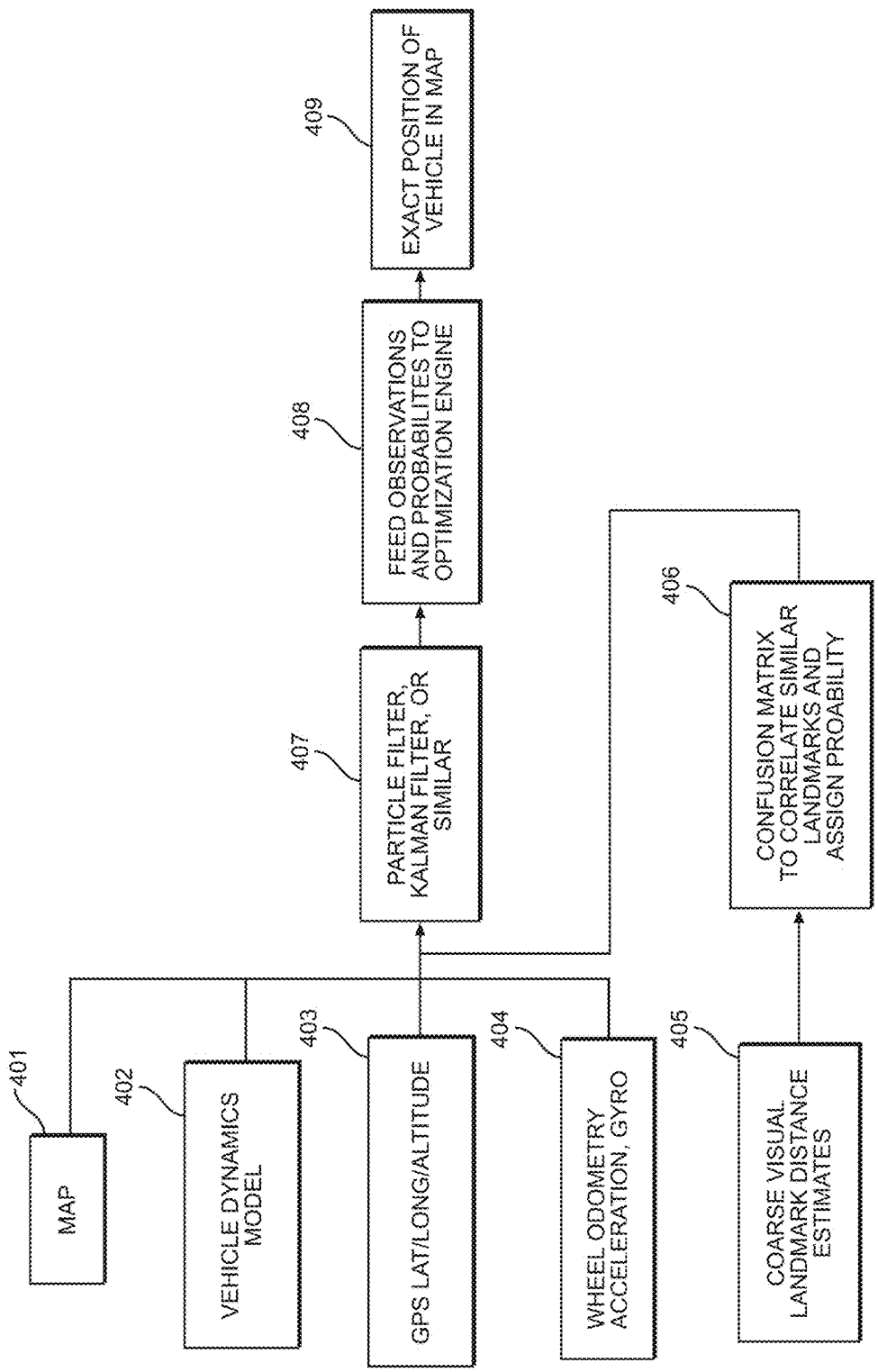
FIG. 4 illustrates a method for localizing a vehicle in a three-dimensional feature map of a roadway according to an embodiment.

FIG. 4 illustrates a method for localizing a vehicle in a three-dimensional feature map of a roadway according to an embodiment. Global map 401 is received from a central server or computing platform. Vehicle dynamics model 402 may be retrieved from memory or inferred from telemetry data. GPS position 403 and other telemetry data 404 such as odometer data, acceleration data, and gyro data are received from various sensors throughout a vehicle. Then, coarse estimates for distance to features 405 is derived from imaging data, and a confusion matrix 406 is applied to correlate similar features and landmarks and assign any probability of confusion. All of these data points are then fed into a filter 407 such as a particle filter or a Kalman filter, and subsequently into an optimization engine 408 to determine a best fit for all features and constraints in a three-dimensional map. Finally, a position 409 of the vehicle is derived from the map.

The ability to localize a vehicle on a roadway with such precision may be useful in a number of applications. For example, in an embodiment the three-dimensional map and localization method described above may be used to determine which traffic light is relevant to the vehicle. Traffic lights may commonly have several individual light clusters for different lanes of traffic. If the lane of traffic is not known, a vehicle may not be able to determine which traffic light is most appropriate for it. By localizing the vehicle down to a high degree of accuracy, the exact lane of traffic of the vehicle may be determined. Then, the appropriate traffic light of a group of traffic lights may be determined based on this lane knowledge. In some embodiments, a neural network may be used to predict the relevant traffic light for a given lane of traffic. In some embodiments, an association between traffic lanes and traffic lights may be determined by observation. That is, because the three-dimensional feature mapping system acquires traffic flow data and traffic light data via telemetry acquisition, an association between traffic flow and traffic light state may be derived. Similarly, road markings captured by imaging sensors and vision systems used to generate the three-dimensional feature maps may be interpreted to determine lane configuration. For example, a left turn lane may present predictable lane markings indicating that it is a left turn lane. In some embodiments, human operators may manually assign traffic lights to individual lanes of traffic and store that association information in the three-dimensional feature map.

Figure 5:
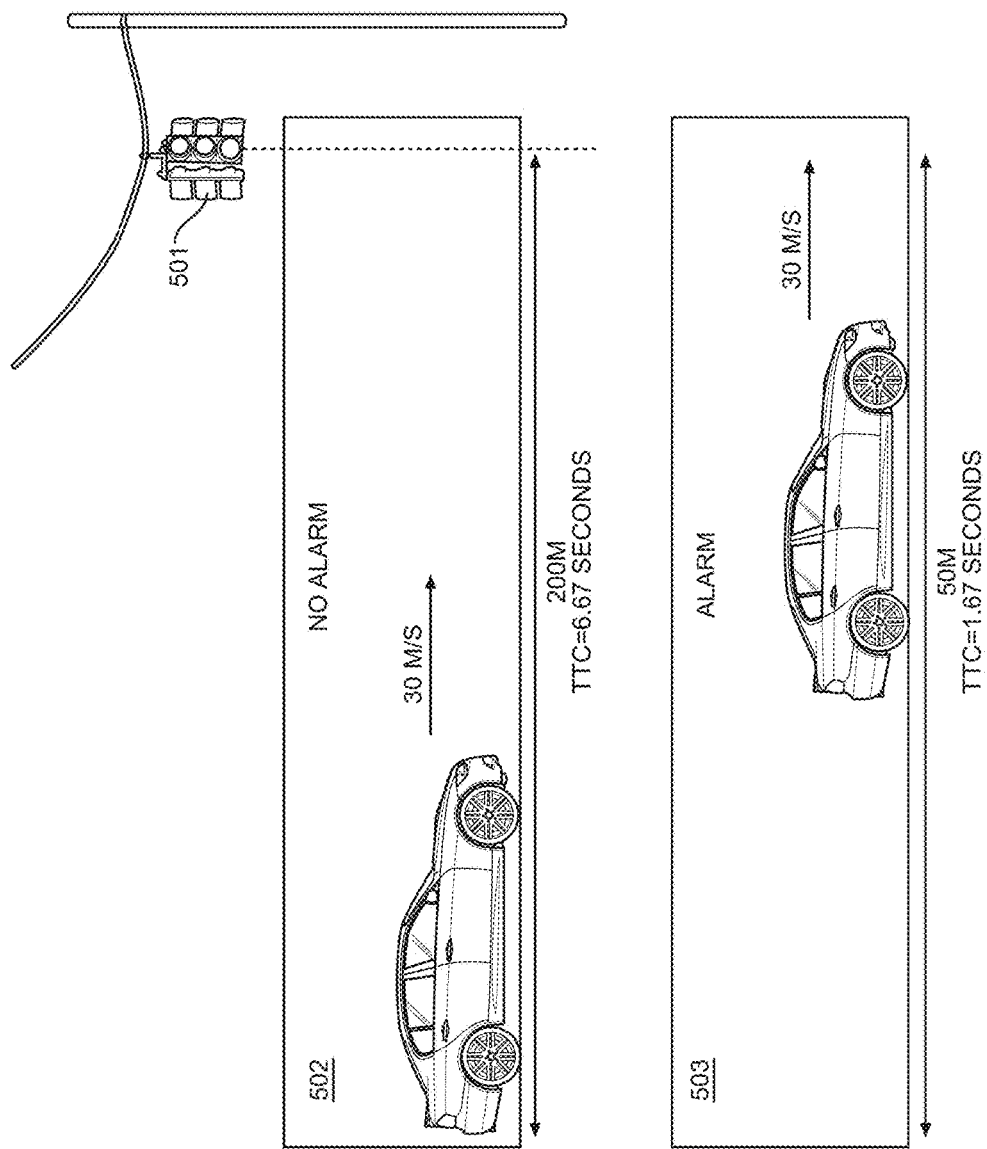
FIG. 5 illustrates an example emergency braking application according to an embodiment.

FIG. 5 illustrates an example emergency braking application according to an embodiment. In this example, the vehicle in scenario 502 is travelling 30 m/s and is 200 m from traffic light 501. In scenario 502, no alarm is issued. In scenario 503, the vehicle is still travelling 30 m/s but is now only 50 m from traffic light 501. Under these conditions, an alarm is set because the vehicle is travelling too fast for its distance to the traffic light.

Another example application of the three-dimensional feature mapping system includes warning drivers as to upcoming traffic signals or signs or identifying traffic signals and signs for autonomous vehicle applications. For example, one application may be to warn drivers when they are about to drive through a red light or stop sign. In this application, the known location of stop signs and signal lights is determined through the localization of the vehicle within a global feature map. Then, the state of any relevant traffic signals may be determined through the vision systems that generate imaging data for the three-dimensional feature mapping system. Because the global feature map presents a bounding box of where the lights are, the vision system may easily determine which lights are active in the traffic light. Then, once the desired stopping point is determined, a stopping distance of the vehicle may be estimated based on other telemetry data such as vehicle speed and position. If the vehicle's estimated time to cross through the intended stop point based on vehicle's current speed and acceleration is below a threshold value, the system may alert the user or begin braking the vehicle autonomously.

Another application of locating traffic signs and lights may be to aid the navigation of an autonomous vehicle. Just as a driver may be warned of an upcoming traffic light or sign, an autonomous vehicle driver may use the same precise location information for these features to navigate and route an autonomous vehicle to respond to traffic signs and lights. In response to detecting traffic signs and lights, a processor of the autonomous vehicle may activate control functions of the vehicle such as turning left or right, braking, or accelerating.

Figure 6:
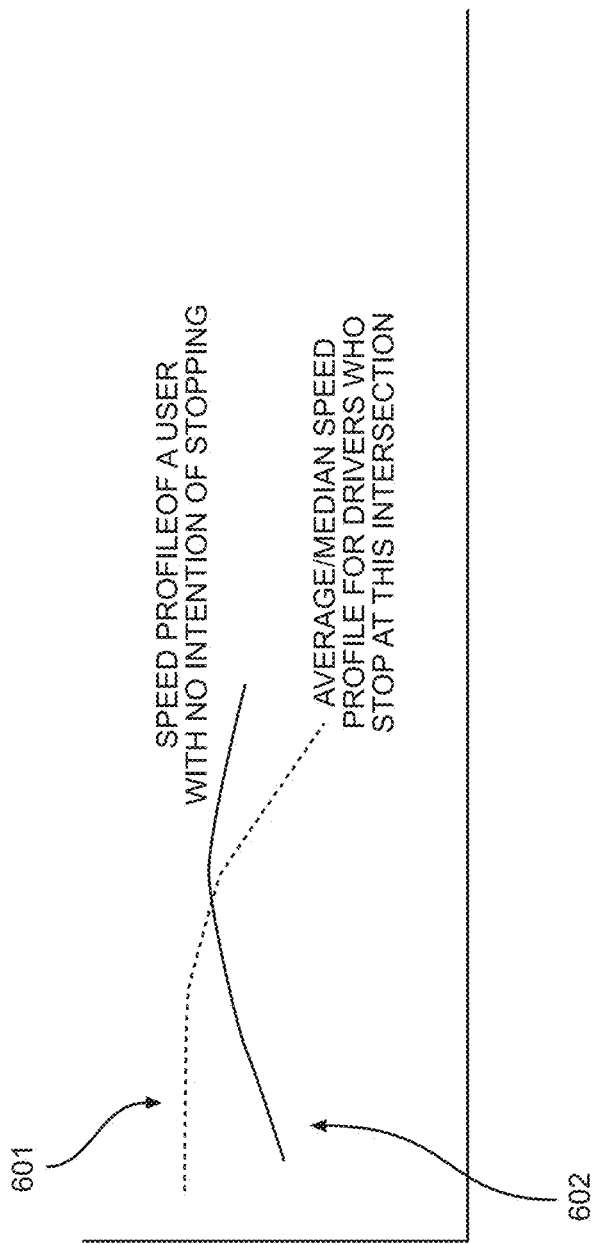
FIG. 6 illustrates an example deceleration curve for a vehicle according to an embodiment.

FIG. 6 illustrates an example deceleration curve for a vehicle according to an embodiment. The horizontal axis represents distance and the vertical axis represents speed. Curve 601 represents a deceleration curve of a vehicle who makes a successful stop at an intersection. As the vehicle travels a further distance along the horizontal axis, the speed steadily decreases. Curve 602 represents a deceleration curve of a vehicle that is not slowing down as it approaches the intersection. In this case, the system may issue an alert or emergency braking signal to stop the car.

In some embodiments, the three-dimensional feature mapping system may derive vehicle behavior predictions based on recorded previous vehicle behavior. For example, previous times vehicles have stopped at a particular stop sign may be analyzed to determine the appropriate deceleration curve for that given stop sign. Then, a vehicles behavior may be compared to this aggregate deceleration curve in real-time as the vehicle approaches the stop sign to predict if the vehicle will successfully stop at the intended target.

For example, if a driver is texting and driving and does not see a stop sign, the three-dimensional feature mapping system may detect that the driver's vehicle is travelling too fast for its distance to the stop sign. The three-dimensional feature mapping system may alert the driver at a certain timeframe or distance before crossing the stop sign line as to the impending stop sign. The distracted driver may then have sufficient time and distance to refocus on driving, and brake in time to stop appropriately.

In another example, if a driver is driving on an unfamiliar road with traffic lights, the new driver may be confused as to which traffic light applies to the lane which their vehicle is in. If the appropriate light, as determined using the methods described above, is red and the new driver has not initiated a stop, the three-dimensional feature mapping system may similarly issue an audible or visual warning, or even initiate an emergency braking procedure autonomously.

These various examples may also apply to autonomous or semi-autonomous vehicle operations. For example, the response to detecting a potentially missed red light or stop sign may be different if the vehicle is in an autonomous or semi-autonomous driving mode. One example of such a driving mode is an adaptive cruise control. The three-dimensional feature mapping system may issue a braking signal more readily when in such a driving mode when the driver may be expected to be less attentive or have a higher reaction time.

Emergency braking incidents may be recorded and monitored for later analysis. For example, in some embodiments, emergency braking incidents may be used by an insurance company to determine high-risk drivers.

In another example application, the three-dimensional feature mapping system may be further used for municipal audit of roadways. Various statistics or reports may be compiled for a road managing authority to detect anomalies such as potholes or damaged road signs. Similarly, two-dimensional maps of all road signs and signals may be derived from the global three-dimensional feature map for audit and management purposes.

Figure 7:
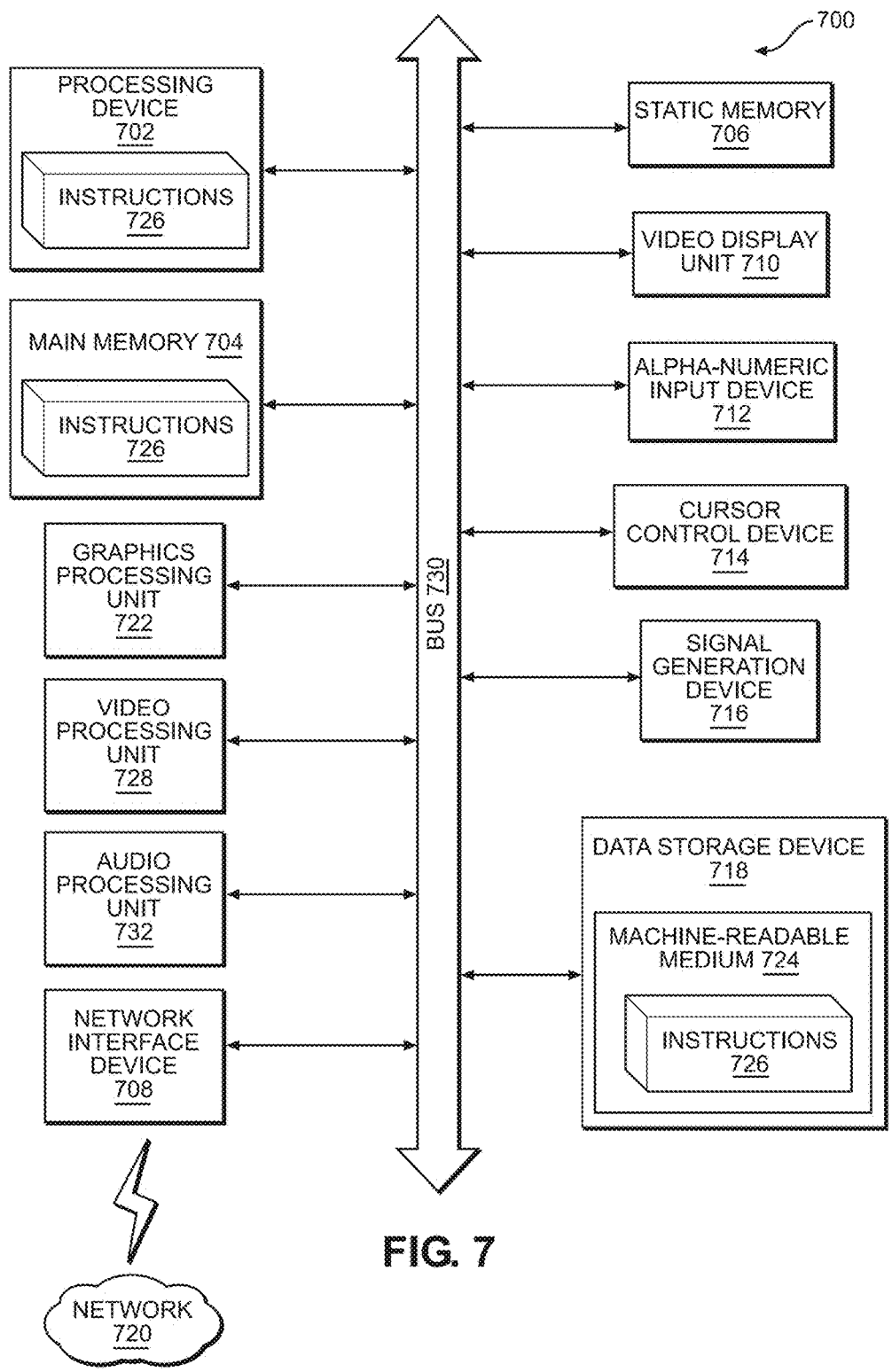
FIG. 7 illustrates an example machine of a computer system within which a set of instructions, for causing the machine to perform any one or more of the methodologies discussed herein, may be executed.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method of three-dimensional mapping, comprising:
   receiving telemetry data from a device, wherein the telemetry data corresponds to sensor data associated with the device;
   receiving imaging data of a road and surrounding areas from the device;
   identifying a set of features in the imaging data, the imaging data and the telemetry data comprising feature location information;
   estimating, based on the imaging data and the telemetry data, a set of constraints related to each of the features identified in the imaging data;
   generating a graph representing the set of features and the set of constraints, the graph comprising a set of vertices corresponding to the features and a set of edges corresponding to the constraints, the graph comprising at least one edge representing a distance between a first feature and a second feature and at least one edge representing a distance between the first feature and the device, the graph representing a non-linear system of equations, wherein each edge includes an estimated error associated with the corresponding constraint, the estimated error being a function of circumstances of an observation;
   solving the non-linear system of equations to determine a plurality of feature locations, wherein the plurality of determined feature locations are more accurate than the feature location information from the imaging data and telemetry data;
   generating, by a mapping platform, a three dimensional map of the set of features based on the determined feature locations.

2. The method of claim 1, wherein the device is associated with a vehicle, and the vehicle is driving on the road.

3. The method of claim 2, wherein a portion of the sensor data is generated by sensors attached to the vehicle.

4. The method of claim 2, wherein the mapping platform is attached to the vehicle, and further comprising:
   generating a compressed representation of the three-dimensional map by representing each feature as a labeled bounding box positioned in a three dimensional coordinate system; and
   transmitting the compressed representation of the three dimensional map to a server remote from the vehicle.

5. The method of claim 4, wherein the server receives the compressed representation of the three-dimensional map and merges it with a global three-dimensional map.

6. The method of claim 1, wherein the set of constraints for each feature includes at least an estimate of a size of the feature and an estimate of a distance from the device to the feature.

7. The method of claim 6, wherein the estimate of a size of the feature and the estimate of the distance from the device to the feature are determined from the imaging data using a monocular simultaneous location and mapping technique.

8. The method of claim 1, wherein the identifying a set of features in the imaging data includes assigning each pixel of the imaging data a classification using a pre-trained classification network.

9. The method of claim 8, wherein the pre-trained classification network is a convolutional neural network.

10. A method of localizing a vehicle on a road, comprising:
    receiving, from a server, a global feature map identifying features of the road;
    generating, by a mapping platform, a local feature map of the road and surrounding areas based on telemetry and imaging data acquired by sensors on the vehicle; and
    identifying a location of the vehicle on the road based on a comparison between the global feature map and the local feature map.

* * * * *